Dec. 23, 1930.    M. HAPPONE    1,786,064
VENTILATOR SYSTEM
Filed May 6, 1929    2 Sheets-Sheet 1

INVENTOR
Matt Happone
BY Whittemore Hulbert
Whittemore + Belknap
ATTORNEYS

Dec. 23, 1930.       M. HAPPONE       1,786,064
VENTILATOR SYSTEM
Filed May 6, 1929    2 Sheets-Sheet 2
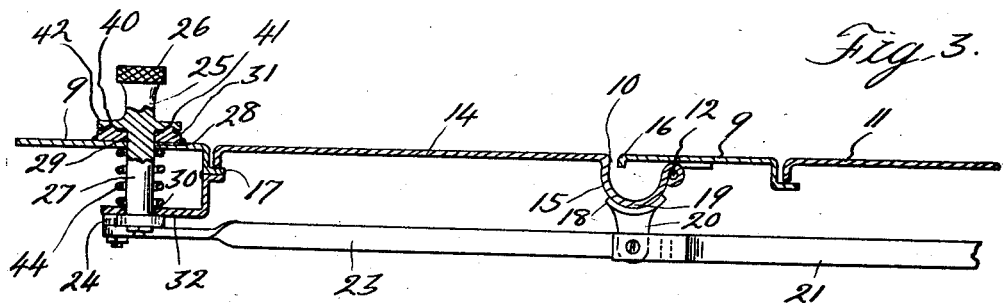
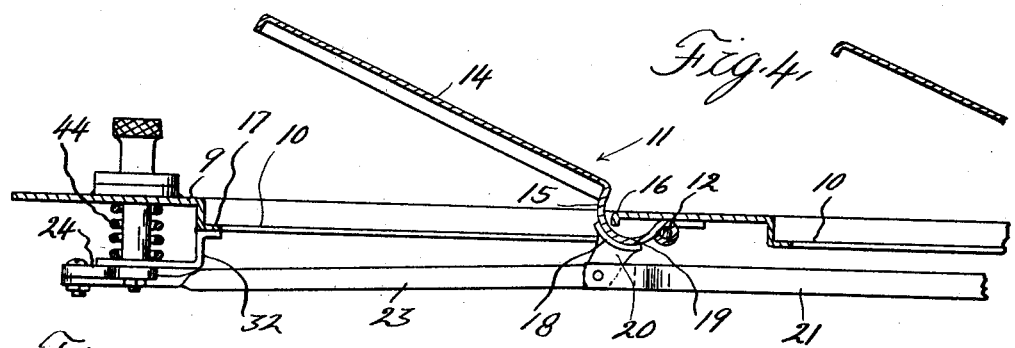
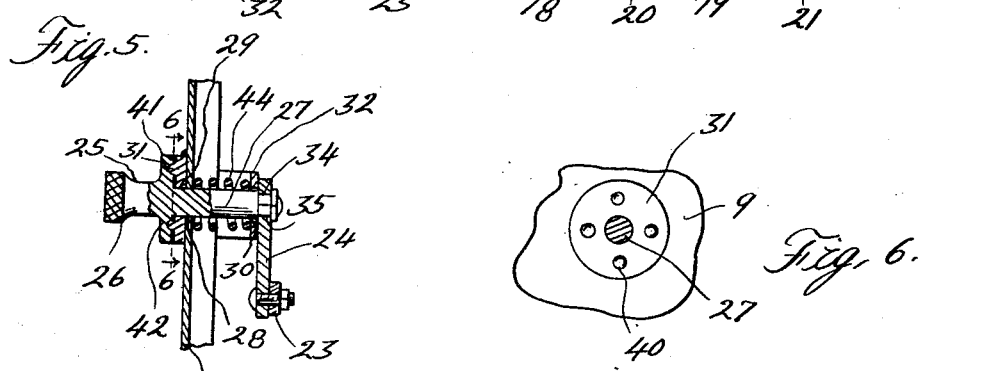
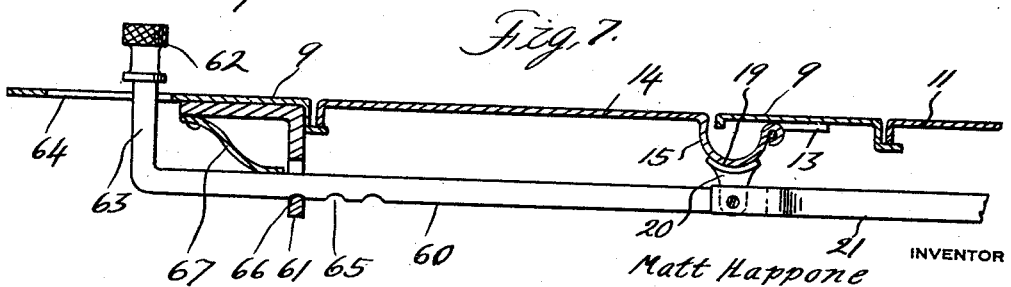
INVENTOR
Matt Happone
BY Whittemore Hulbert
Whittemore & Belknap
ATTORNEYS Patented Dec. 23, 1930

1,786,064

UNITED STATES PATENT OFFICE

MATT HAPPONE, OF DETROIT, MICHIGAN, ASSIGNOR TO BRIGGS MANUFACTURING COMPANY, OF DETROIT, MICHIGAN, A CORPORATION OF MICHIGAN

VENTILATOR SYSTEM

Application filed May 6, 1929. Serial No. 360,903.

This invention relates generally to ventilators for motor vehicles and consists of certain novel features of construction, combinations and arrangements of parts that will be hereinafter more fully described and particularly pointed out in the appended claim.

In the accompanying drawings:

Figure 3 is a sectional view taken on the line 3—3 of Figure 2;

Figure 4 is a view similar to Figure 3 but showing the shutters of the ventilator mechanism in open position;

Figure 5 is a fragmentary vertical sectional view through the operating means;

Figure 6 is a sectional view taken on the line 6—6 of Figure 5;

Figure 7 is a view similar to Figure 3 but showing a slightly modified construction.

Figure 1:
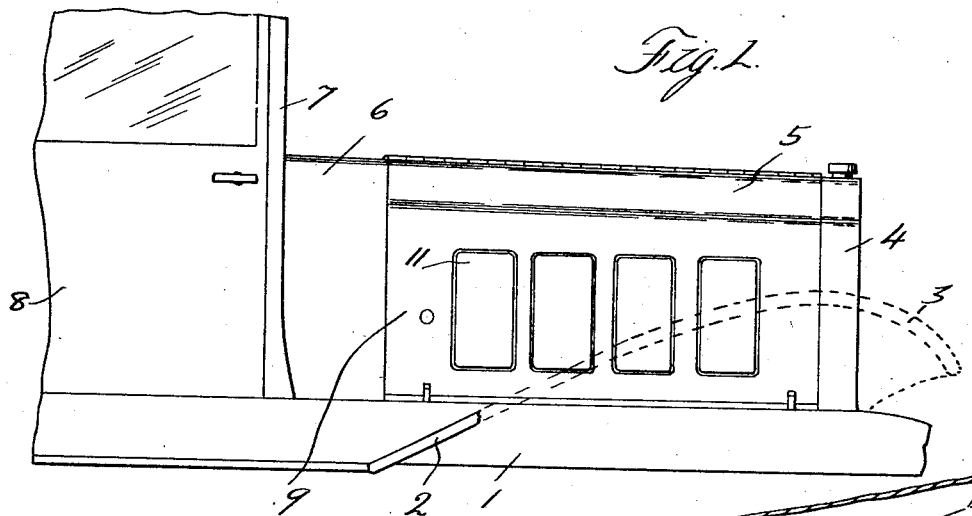
Figure 1 is a fragmentary side elevation of a motor vehicle and showing a ventilator mechanism embodying my invention applied to the engine hood thereof.

Referring now to the drawings, 1 is the chassis frame, 2 and 3 are front fenders, 4 is the radiator, 5 is the engine hood, 6 is the cowl, 7 is the front body pillar, and 8 is a door of a motor vehicle.

As shown, the upright side sections 9 of the hood are provided intermediate of their ends with a series of longitudinally spaced ventilator openings 10 that are substantially rectangular in shape and project upwardly with respect to the chassis frame 1. The shutters 11 control these openings 10 and are preferably hingedly mounted upon upright pins 12 fixed in brackets 13 rigid with the sections 9 at the forward edges of the openings 10. Preferably the shutters 11 have substantially flat portions 14 that are adapted to be moved into alignment with the section 9 to close the openings 10, and have outwardly opening upwardly extending channel portions 15 at the hinged edges thereof that are adapted to embrace the edges 16 of the section 9 when the shutters are opened. Any suitable means, such as the inwardly offset flanges 17 of the section 9, may be used as abutments or jamb members for the shutters when closed.

Figure 2:
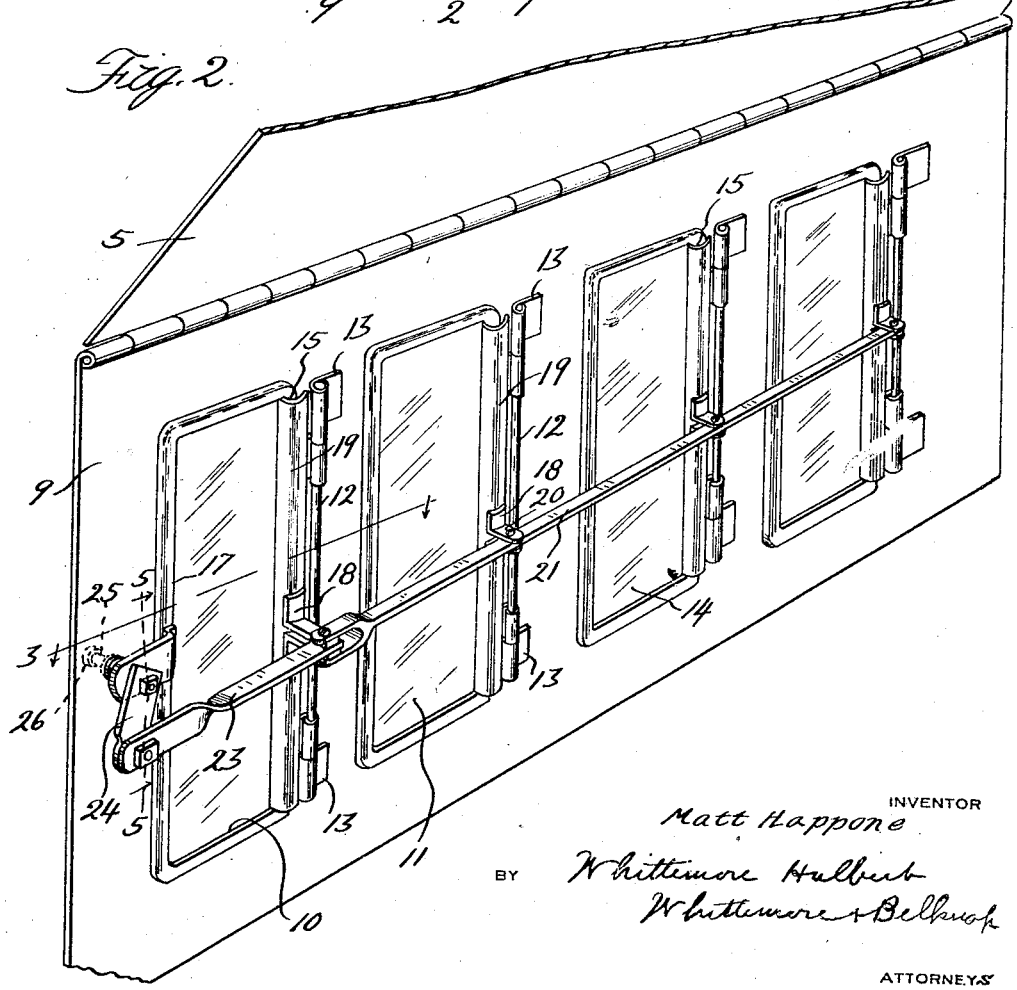
Figure 2 is an enlarged fragmentary perspective view of the engine hood and ventilator mechanism.

With this construction the shutters constituting the closures for the openings 10 have a common actuating means and are operated simultaneously. As shown, brackets 18 are welded to the bases 19 of the channel portions of the shutters and are provided with inwardly projecting arms 20. A bar 21, substantially parallel to the section 9, is pivotally connected to said bracket arms 20 at the inner ends thereof and, as illustrated in Figures 1 to 6 inclusive, is adapted to be moved longitudinally by the links 23 and 24 and rotatable finger piece 25. Preferably, the finger piece 25 has a knurled handle portion 26 projecting laterally from the outer face of the hood section 9 and has a shank 27 extending through aligned openings 28, 29 and 30 respectively in the section 9, bearing plate 31 and bracket 32 and non-rotatably connected to the link 24. As shown, the inner end 34 of this shank 27 is reduced and square shape in cross section, and the link 24 has a square opening 35 that receives the reduced end 34 of the shank. Thus, when the parts are assembled the link 24 will be swung in the arc of a circle when the handle 26 is rotated. The link 23 extends between and is terminally connected to the link 24 and bar 21, hence when the link 24 is moved in an arc by the handle 26, the link 23 will move the bar 21 longitudinally and cause the shutters 11 to be opened or closed. Preferably the bearing plate 31 is rigid with the section 9 and is provided with spaced outwardly projecting ridges 40 that are arranged in a circle upon its outer face and are adapted to engage correspondingly shaped recesses 41 in a peripheral flange 42 of the handle shank 27 to detachably hold the operating means and shutters in adjusted position. The bracket 32 is welded to the flange 17 and is formed of spring metal. Preferably a coil spring 44 is sleeved upon the shank 27 between this bracket 32 and the hood section 9 and the arrangement is such that pressure exerted by the spring 44 springs the bracket 32 slightly outwardly relative to the hood 29, enough to maintain the flange 42 against the bearing plate 31.

In Figure 7 I have shown a slight modification in which the bar 21 is adapted to be moved longitudinally by a longitudinally movable substantially L-shape rod 60. As shown, this rod 60 is slidably mounted in a bracket 61 on the inner face of the hood section 9 and is provided at its outer end with a knob 62 by which it may be conveniently manipulated. The lateral portion 63 of this rod is received in and movable longitudinally of an elongated slot 64 in the section 9, while the rod proper, 60, has a series of notches 65 in one edge thereof that are adapted to successively receive an edge 66 of the bracket 61 to hold the rod 60 and shutters in adjusted position. Preferably, a leaf spring 67 is anchored on the bracket 61 and presses against the rod 60 to insure proper engagement of the notches 65 and edge 66.

Thus, from the foregoing description it will be readily apparent that I have provided a very efficient and practical ventilator construction that is especially adapted for use in connection with the hoods of motor vehicles. The shutters are easily and quickly operated and are effectively held in adjusted position. The construction is simple, light and durable and can be manufactured and installed at a comparatively low cost.

While it is believed that from the foregoing description, the nature and advantages of the invention will be readily apparent, I desire to limit myself to what is herein shown and described and that such changes may be resorted to when desired as fall within the scope of what is claimed.

What I claim as my invention is:

In combination, an automobile hood having a series of vent openings therein, closures for said openings, a bracket secured to said hood, actuating means for said closures including a rod upon the inner side of said hood connected to said closures, an operating member upon the outer side of said hood, an operating connection between said rod and operating member including a part extending through said hood and bracket, and yieldable means associated with said bracket for yieldingly retaining said part in adjusted position and preventing said part from rattling.

In testimony whereof I affix my signature.

MATT HAPPONE.